(12) United States Patent
Meinherz

(10) Patent No.: US 8,878,901 B2
(45) Date of Patent: Nov. 4, 2014

(54) TIME OF FLIGHT CAMERA UNIT AND OPTICAL SURVEILLANCE SYSTEM

(75) Inventor: Carl Meinherz, Malans (CH)

(73) Assignee: Cedes Safety & Automation AG, Landquart (CH)

( * ) Notice: Subject to any disclaimer, the term of this patent is extended or adjusted under 35 U.S.C. 154(b) by 454 days.

(21) Appl. No.: 13/086,686

(22) Filed: Apr. 14, 2011

(65) Prior Publication Data

US 2011/0254928 A1 Oct. 20, 2011

(30) Foreign Application Priority Data

Apr. 15, 2010 (EP) ..................................... 10004001

(51) Int. Cl.
| | | |
|---|---|---|
| *H04N 13/02* | (2006.01) | |
| *G01S 17/89* | (2006.01) | |
| *G01S 17/36* | (2006.01) | |
| *G06T 7/00* | (2006.01) | |
| *G01B 11/245* | (2006.01) | |
| *G01B 11/22* | (2006.01) | |
| *G01B 11/24* | (2006.01) | |
| *G01S 17/87* | (2006.01) | |

(52) U.S. Cl.
CPC .................. *G01S 17/89* (2013.01); *G01S 17/36* (2013.01); *G01S 17/87* (2013.01); *G06T 7/0065* (2013.01); *G01B 11/245* (2013.01); *G01B 11/22* (2013.01); *G01B 11/24* (2013.01)
USPC .............................................. 348/46; 348/42

(58) Field of Classification Search
CPC ...... G01B 11/22; G01B 11/24; G01B 11/245; G06T 7/0065; G01S 17/89; G01S 17/36; G01S 17/87; C07K 14/21

USPC .......................................................... 348/46
See application file for complete search history.

(56) References Cited

U.S. PATENT DOCUMENTS

| | | | | |
|---|---|---|---|---|
| 5,903,355 | A * | 5/1999 | Schwarz | ........................ 356/394 |
| 6,323,942 | B1 | 11/2001 | Bamji | |
| 6,327,430 | B1 * | 12/2001 | Ikemori et al. | ................... 396/29 |

(Continued)

FOREIGN PATENT DOCUMENTS

| | | | | |
|---|---|---|---|---|
| EP | 2073035 A1 * | 6/2009 | .............. G01S 7/497 |
| WO | 2005064525 A1 | 7/2005 | |

OTHER PUBLICATIONS

T. Ringebeck, et al.; "Multidimensional measurement by using 3-D PMD sensors", Advances in Radio Science, 5, pp. 135-146, 2007.

(Continued)

*Primary Examiner* — Andy Rao
*Assistant Examiner* — Shan Elahi
(74) *Attorney, Agent, or Firm* — Boyle Fredrickson, S.C.

(57) ABSTRACT

A time of flight, TOF, camera unit for an optical surveillance system and an optical surveillance system comprising such a TOF camera is disclosed. The TOF camera unit comprises a radiation emitting unit for illuminating a surveillance area defined by a first plane, a radiation detecting unit for receiving radiation reflected from said surveillance area and for generating a three-dimensional image from said detected radiation, and at least one mirror for at least partly deflecting said emitted radiation into at least one second plane extending across to said first plane and for deflecting the radiation reflected from said second plane to the radiation detecting unit. The TOF camera and the at least one mirror may be arranged on a common carrier element.

19 Claims, 6 Drawing Sheets

(56) References Cited

U.S. PATENT DOCUMENTS

| | | | |
|---|---|---|---|
| 6,642,955 B1* | 11/2003 | Midgley et al. | 348/164 |
| 7,202,898 B1* | 4/2007 | Braun et al. | 348/301 |
| 7,620,202 B2* | 11/2009 | Fujimura et al. | 382/103 |
| 7,741,961 B1* | 6/2010 | Rafii et al. | 340/435 |
| 2003/0209893 A1* | 11/2003 | Breed et al. | 280/735 |
| 2004/0001149 A1* | 1/2004 | Smith | 348/218.1 |
| 2004/0179093 A1* | 9/2004 | Inan | 348/36 |
| 2006/0058683 A1* | 3/2006 | Chance | 600/476 |
| 2006/0067579 A1* | 3/2006 | Pirkl et al. | 382/190 |
| 2008/0144885 A1* | 6/2008 | Zucherman et al. | 382/103 |
| 2010/0063681 A1* | 3/2010 | Correns et al. | 701/41 |
| 2010/0141734 A1* | 6/2010 | Tani et al. | 348/36 |
| 2010/0283888 A1* | 11/2010 | Mirbach et al. | 348/348 |
| 2011/0018967 A1 | 1/2011 | Mirbach et al. | |
| 2011/0074965 A1* | 3/2011 | Lee et al. | 348/218.1 |

OTHER PUBLICATIONS

European Search Opinion for European Patent 10004001.3; dated Jun. 8, 2012 (3 pages).

* cited by examiner

TIME OF FLIGHT CAMERA UNIT AND OPTICAL SURVEILLANCE SYSTEM

CROSS-REFERENCE TO RELATED APPLICATIONS

This application claims priority to European Patent Application No. EP 10004001, titled Time of Flight Camera Unit and Optical Surveillance System and filed Apr. 15, 2010, the entire contents of which is incorporated herein by reference.

BACKGROUND OF THE INVENTION

The subject matter disclosed herein relates to a time of flight, TOF, camera unit for an optical surveillance system and to an optical surveillance system comprising such a TOF camera.

During the last few years, the first all-solid state three-dimensional cameras (3-D cameras) based on the time of flight (TOF) principle became available on the market. 3-D cameras or sensors based on the time of flight principle acquire distance information from objects in a scene being imaged. Distance information is produced independently at each pixel of the camera sensor. As for instance described in U.S. Pat. No. 6,323,942, a TOF system emits optical energy and determines how long it takes until at least some of that energy reflected by a target object arrives back at the system to be detected. Emitted optical energy traversing to more distant surface regions of a target object before being reflected back towards the system will define a longer TOF than if the target object were closer to the system. If a round trip TOF is denoted t, then the distance d between the target object and the TOF system can be calculated as d=t·c/2, with c being the velocity of light.

Such known systems can acquire both luminosity data (signal amplitude) and TOF distance, and can produce three-dimensional images of a target object in real time.

Rather than directly measuring a time of flight, which requires very sensitive imaging equipment, a more sophisticated principle is based on a phase measuring TOF principle. Here, instead of directly measuring a light pulse's total trip, the phase difference between sent and received signals is determined. When modulating the transmitted light with a modulation frequency, $f_m$, the distance between the point of reflection and the camera can be calculated as $$d = \frac{c}{2f_m} \cdot \frac{\varphi}{2\pi} \quad (1)$$

The detection of the reflected light signals over multiple locations in a system pixel array results in measurement signals, that are referred to as depth images. The depth images represent a three-dimensional image of the target object surface.

FIG. 4 shows such a known system 200 for surveillance of a predefined surveillance area. As shown in FIG. 4, a TOF camera 202 is mounted in a distance from a background 204 that allows to survey a sufficiently large detection field. In the figure, only the radiation beams emitted by the TOF camera 202 are schematically shown and denoted with reference numeral 206, but not the returning detected beams. Depending on the aperture of the employed TOF camera 202, the detection field is limited as indicated by detection field limits 208.

A problem arises when an object to be detected 210 enters the detection field. As schematically shown in FIG. 5, those radiation beams 206, which reach the upper surface of the object 210, are reflected and reach the TOF camera 202, providing a three-dimensional image of the first surface 212 of the object 210. However, due to shading effects with the known surveillance system 200 the problem occurs that invisible areas 214 of the object 210 remain. For an unambiguous automatic identification of the object 210, it is often necessary to also receive information about these normally invisible areas 214.

In order to solve this problem, a first possible solution is to provide two cameras 202 and 203. A first camera 202 is oriented in a way that it can monitor area 216 and a second camera 203 is arranged in a way that it can monitor the area 218, which is invisible for camera 202. By combining the images of the two cameras according to the system shown in FIG. 6, the contour of an object can be detected unambiguously. However, the system is costly, requiring two complete TOF cameras and the synchronization of the generated images is difficult.

For an object contour monitoring for larger areas, for instance a door or a through way, it is known from U.S. Pat. No. 5,903,355 to use mirrors in combination with a laser scanner, in order to allow for an indirect detection of shapes which are not visible to the scanner directly, by means of the reflection of the scanning ray in the mirrors. To this end, a larger deviation angle of the laser beam than need for the viewing area must be scanned, so that the mirror area is included in the scanning movement as well. However, as this is known for laser scanners, the viewing field of this arrangement is only in one plane and no three-dimensional image can be generated from the retrieved data. Furthermore, the signal processing routine proposed in this document is only working in combination with a moving laser scanning beam. Furthermore, the arrangement according to U.S. Pat. No. 5,903,355 is not suitable for short-distance applications.

Consequently, there exists a need for an improved optical surveillance system which on the one hand is robust, economic and user friendly and which on the other hand yields comprehensive three-dimensional contour information also for short distanced objects.

BRIEF DESCRIPTION OF THE INVENTION

According to one embodiment of the present innovation, a time of flight, TOF, camera unit for an optical surveillance system and at least one mirror, which at least partly deflects the emitted radiation into at least one second plane extending across to the first plane and deflects the radiation reflected from the second plane back to the radiation detecting unit, detects a three-dimensional image of directly visible and shadowed parts of the object in a particularly simple and secure way. In particular, only one TOF camera is needed which therefore obviates the necessity of synchronizing a plurality of TOF cameras.

When calculating the distance which the light has travelled by means of the above-explained phase shift principle, the calculation relies on the physical fact that the phase of the modulation of the radiation is considered which is not influenced by the reflection at the mirror.

According to one feature of the present invention, the radiation emitting unit comprises at least one light-emitting diode, which represents a particularly efficient and easily controllable way of providing an illumination of the surveillance area.

According to another embodiment of the present invention, the radiation detecting unit comprises a phase sensitive detector chip and a signal processing unit for evaluating the output of said at least one detector chip, deriving from the phase shift a distance information about the distance which the light had travelled from the radiation emitting unit back to the radiation detecting unit. For determining the phase shift, a modulated radiation has to be sent by said radiation emitting unit. Such phase sensitive detector chips may for instance be based on so-called photonic mixer devices, PMD. In particular, when providing an intelligent pixel array, the surveillance area illuminated with modulated light can be monitored by individually measuring the turnaround time of the modulated light by means of each pixel individually. Typically this is done by using a continuous modulation and by measuring the phase delay in each pixel. The PMD sensor arrays can be fabricated in CMOS technology. Because the complete mixing process of the electric and optical signals takes place within each pixel, the PMD elements are also called smart pixels. The principle of such a sensor is for instance explained in the article by Ringbeck et al. "Multidimensional measurements by using 3-D PMD sensors", Adv. Radio Sci., 5, 135-146, 2007.

The signal processing unit according to one embodiment of the present invention preferably is operable to define and evaluate a first depth level representing the area directly illuminated by said radiation emitting unit, and at least a second depth level representing the area illuminated by said radiation emitting unit via said at least one mirror. The images corresponding to these two depth levels are combined for generating a three-dimensional image of the total surveillance area including shadowed parts of objects to be detected. By restricting the signal processing to these depth levels, background signals can be effectively suppressed.

According to another embodiment, the TOF camera and the at least one mirror are mounted in one common carrier element and fixed in their position with respect to each other. When fabricating the TOF camera unit including the mirrors as one compact device, all calibration routines can be done when fabricating the device and the user does not have to run any adaptive learning routines. All parameters can be derived directly from the geometric arrangement of the TOF camera with respect to the mirrors.

According to one feature of the present invention, the TOF camera has a viewing angle which is larger than needed for monitoring the surveillance area and the at least one mirror is located in a peripheral region of the viewing angle. The required size of the viewing angle can be achieved either by mechanically enhancing the viewing angle, for instance by means of a curved arrangement of the pixels of the radiation detecting unit as well as the radiation emitting unit. Alternatively, other means for providing a sufficiently large viewing angle, for instance the use of optical lenses, can be applied.

According to yet another aspect of the invention, the TOF camera can be located in the centre of a group of mirrors for generating a rotation symmetric information on objects within the surveillance area. Alternatively, the TOF camera can also be located eccentrically with respect to the objects to be detected and only one single mirror is provided to reflect the light beams to and from an area not directly visible for the incident radiation.

Thus, the features of the TOF camera unit according to embodiments of the present innovation can be exploited when using same within a surveillance system which generates safety switching signals in response to the three-dimensional image received from the TOF camera unit.

In particular, the three-dimensional information about objects present in a surveillance area can be used in connection with muting functions of safety switching devices. Muting is characterized as the automatic, temporary suspension of a safety function. Some times the process requires that the machine stops when personnel enter the area, but remain running when automatically fed material enters. In such a case, a muting function is necessary and may be based on a recognition of the entering subject.

To the accomplishment of the foregoing and related ends, certain illustrative aspects of the disclosed innovation are described herein in connection with the following description and annex drawings. These aspects are indicative, however, of but a few of the various ways, in which the principles disclosed herein can be employed, as is intended to include all such aspects and their equivalents. Other advantages and novel features will become apparent from the following detailed description when considered in conjunction with the drawings.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
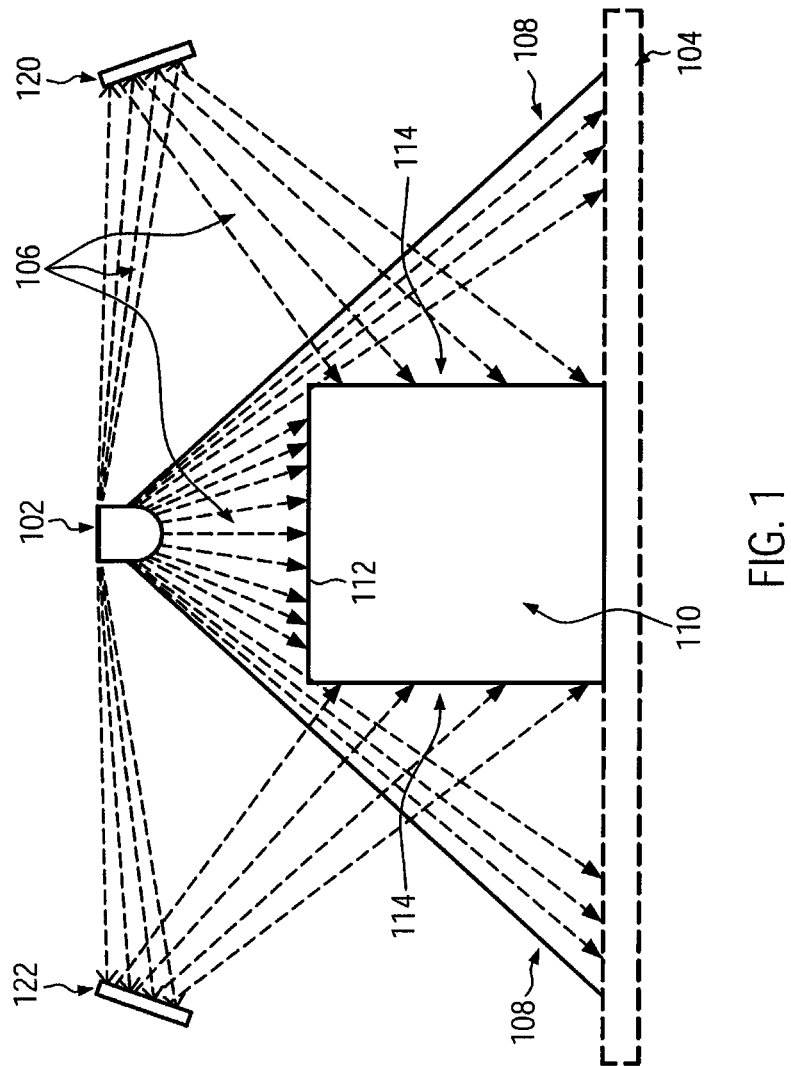
FIG. 1 shows a schematic representation of an optical surveillance system using a time of flight, TOF, camera unit according to a first embodiment.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Referring now to FIG. 1, a time of flight, TOF, camera 102 is combined with two mirrors 120 and 122 for deflecting the radiation 106 sent from the TOF camera 102 to an object 110 and vice versa. Although in FIG. 1 only the emitted radiation is depicted, of course also the reflected radiation from the object and the background runs along the shown path of rays, only with opposite direction. The radiation usually is emitted by light emitting diodes, LED, or infrared radiation emitting diodes, IRED.

The use of the mirrors 120, 122 allows measuring all surfaces of a three-dimensional body with one single TOF camera 102. The radiation beams 106, which are deflected by the mirrors 120, 122, are subjected to an additional electromagnetic phase shift of π by each reflection at the mirror surface resulting in a total of 2 π, when they are received back at the detector of the TOF camera 102. However, the phase of the modulation is not influenced by the reflection. Consequently, the calculation of the time of flight must only take into account an additional optical path length defined by the geometric position of the mirrors 120 and 122 with respect to the TOF camera 102 and the background 104.

According to one embodiment of the present invention, a wide-angle TOF camera 102 is used, which has a wider angle of view than needed to observe the scenery. The part of the viewing field, which is not used to measure the object, can be deflected by the one or more mirrors 120, 122, so that those parts of the object, which are not visible to the TOF camera 102 directly, can be observed and measured indirectly via the mirrors 120, 122. Because the TOF camera 102 is a true three-dimensional measurement system, the field of observation which is added by the mirrors 120, 122 is three-dimensional as well.

In FIG. 1, the viewing angle is limited by the detection field limits 108. The additional radiation beams 106, which are deflected by the mirrors, can, for instance, be generated by additional LED elements, which are arranged in a way that they emit their radiation at a very large viewing angle. Alternatively, the position of the mirrors 120, 122, can be adjusted to reflect beams 106 having a smaller angle of emission.

By defining different depth frames for the expected reflecting planes of the object 112, 114, very effective calculation routines for developing the three-dimensional image of the object can be developed. The TOF camera 102 can be based on photonic mixer devices, PMD. The TOF camera, for instance, comprises an array of infrared light emitting diodes, which illuminate the surveillance area on the background 104, which can, for instance, be a conveyor belt. The PMD sensor chips measure the reflectance of the radiation sent back as well as the phase shift between the modulated sent and detected signal. According to the above-mentioned equation (1), the distance information can be extracted and by correcting the optical path length of those beams which are deflected twice by the mirrors 120, 122, a true three-dimensional image of the object can be generated.

Figure 2:
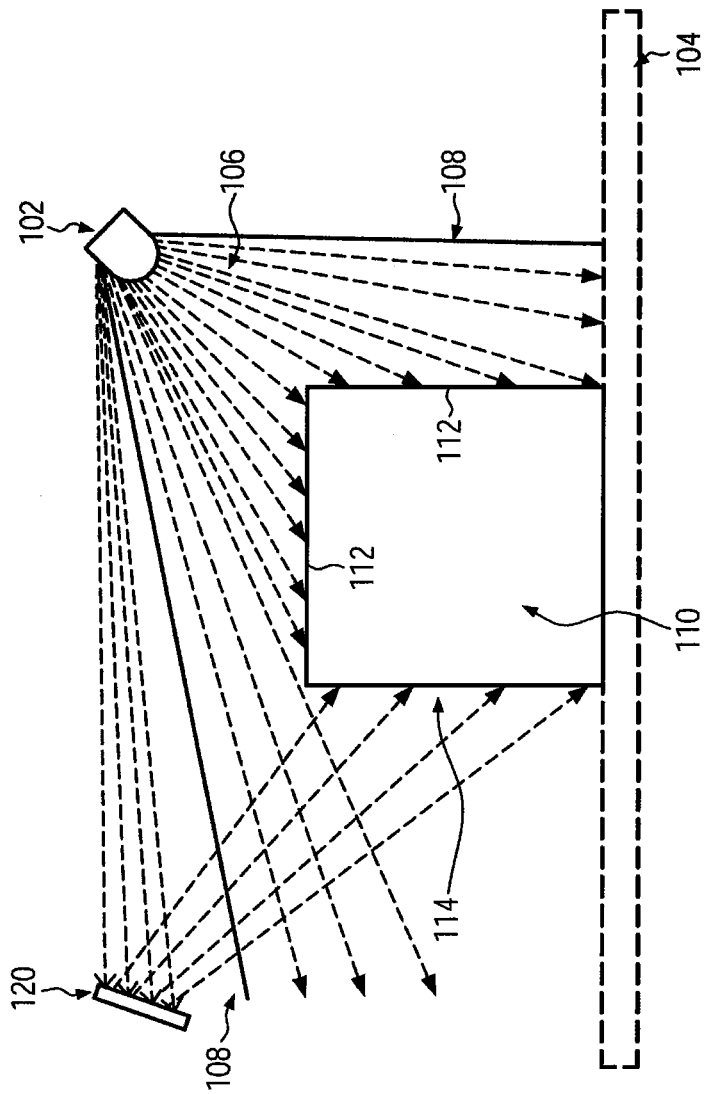
FIG. 2 shows a schematic representation of an optical surveillance system using a TOF camera unit according to a second embodiment.

FIG. 2 shows an alternative embodiment, which uses only one mirror 120. According to this embodiment, the camera 102 is arranged in a way that it is eccentric with regard to an object 110 to be identified. As can be seen from this figure, two first planes 112 can be monitored directly by the TOF camera 102, whereas one second plane 114 is invisible for the directly sent radiation. This second plane 114 is illuminated via a mirror 120 and the light reflected by this object surface is transmitted back to the detector unit of the TOF camera 102 via mirror 120. With this off-centre arrangement only one mirror has to be provided and adjusted with respect to the camera 102.

Figure 3:
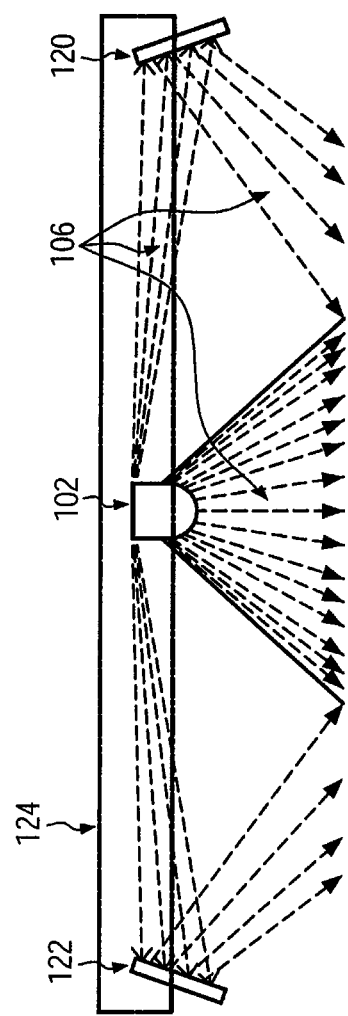
FIG. 3 shows a TOF camera unit according in the arrangement of FIG. 1.
Figure 4:
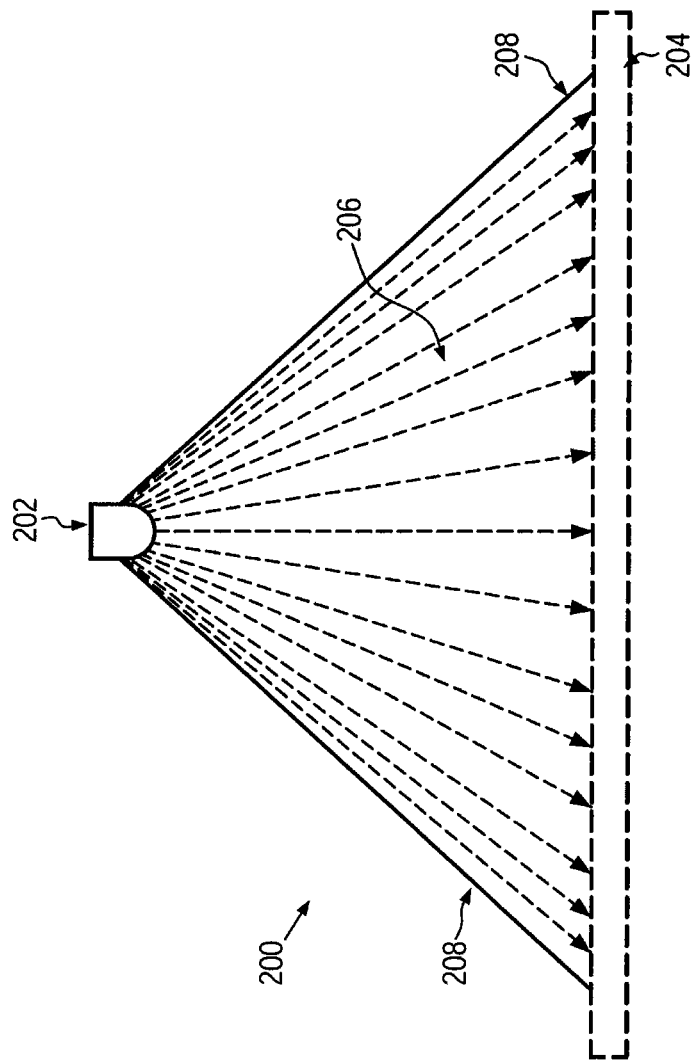
FIG. 4 shows a schematic representation of a conventional optical surveillance system without an object to be detected.
Figure 5:
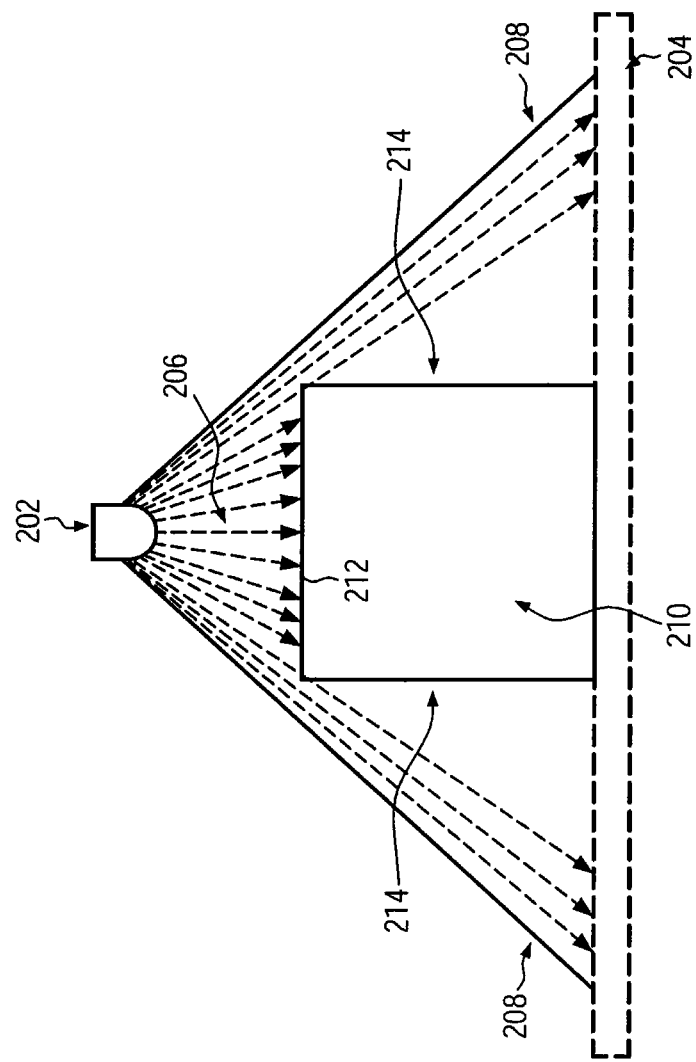
FIG. 5 shows the conventional system of FIG. 4 with an object to be detected.
Figure 6:
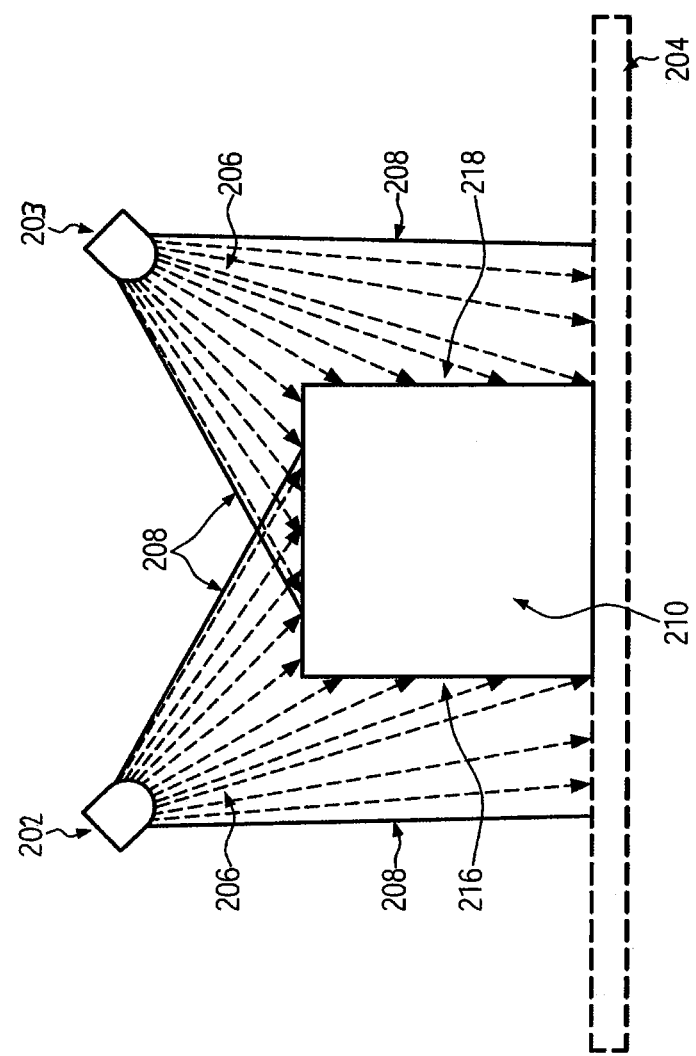
FIG. 6 shows a conventional stereoscopic arrangement with two cameras for detecting the contour of an object.

According to an advantageous embodiment as shown in FIG. 3, the TOF camera 102 and the one or more mirrors 120, 122, are arranged on a common carrier element 124. This carrier element, which can be part of any embodiment according to FIG. 1 or 2, fixes the position of the mirrors in their distance and combination with respect to the TOF camera 102 and allows that the TOF camera unit 100 can be mounted in a surveillance environment without any mechanical adjusting necessary for a user.

Furthermore, the user will not have to perform any learning routines regarding the calculation, because the control unit may be comprised in the TOF camera unit 100 and be pre-initialized prior to delivery. Thus, a robust, easy to use optical surveillance system can be provided, which generates true three-dimensional images also for object, which normally suffer from shadowing effects.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A time of flight (TOF) camera unit for an optical surveillance system, said TOF camera unit comprising:
    a radiation emitting unit for emitting a modulated light for illuminating a surveillance area, wherein the surveillance area is defined by a first plane and a second plane and wherein a first portion of the modulated light illuminates the first plane and a second portion of the modulated light illuminates the second plane;
    a radiation detecting unit for receiving the first portion and the second portion of the modulated light reflected from said surveillance area; and
    at least one mirror for deflecting the second portion of the modulated light onto said second plane and for deflecting the modulated light reflected from said second plane to the radiation detecting unit, wherein the radiation detecting unit includes an array of pixels configured to detect a phase shift in the modulated light reflected from each of the first plane and the second plane and wherein the radiation detecting unit is configured to generate a three-dimensional image based on a first optical path length determined from said detected phase shift in the modulated light reflected from the first plane and based on a second optical path length determined from said detected phase shift in the modulated light reflected from the second plane, wherein the second optical path length is corrected by an additional optical path length defined by a geometric position of the at least one mirror with respect to the TOF camera unit and a background of the surveillance area.

2. The TOF camera unit according to claim 1, wherein said radiation emitting unit comprises at least one light emitting diode, LED, or infrared radiation emitting diode, IRED.

3. The TOF camera unit according to claim 1, wherein said radiation detecting unit comprises a phase sensitive detector chip and a signal processing unit for evaluating outputs of said detector chip.

4. The TOF camera unit according to claim 3, wherein said signal processing unit is operable to define and evaluate a first depth level representing the area directly illuminated by said radiation emitting unit, and at least one second depth level representing the area illuminated by said radiation emitting unit via said at least one mirror,
    wherein said signal processing unit is further operable to combine the images corresponding to the first and second depth levels for generating a three-dimensional image of the total surveillance area.

5. The TOF camera unit according to claim 1, further comprising a carrier element, wherein said at least one mirror is held in a predetermined position with respect to said TOF camera by means of said carrier element.

6. The TOF camera unit according to claim 1, wherein a viewing angle of said radiation detecting unit is larger than needed for monitoring said surveillance area, and wherein said at least one mirror is located in a peripheral region of said viewing angle.

7. The TOP camera unit according to claim 1, wherein an aperture of said radiation emitting unit is larger than needed for illuminating said surveillance area, and wherein said at least one mirror is arranged in a way that it deflects a peripheral portion of the modulated light.

8. The TOF camera unit according to claim 1, wherein said radiation emitting unit and said radiation detecting unit are arranged within a common camera housing and wherein a plurality of mirrors is arranged symmetrically around said camera housing.

9. The TOF camera unit according to claim 1, wherein said radiation emitting unit comprises an array of light emitting diodes, LED, or infrared radiation emitting diodes, IRED, which are arranged on a non-planar substrate and said radiation detecting unit comprises an array of photonic mixer detectors, PMD, which are arranged on a non-planar substrate.

10. An optical surveillance system comprising:
  a time of flight, TOF, camera for three-dimensionally monitoring an object located in front of a background in a surveillance area, the TOF camera having an emitting unit and a detector unit, the emitting unit configured to add a modulation to a radiation, defining a modulated radiation;
  at least one mirror element for deflecting the modulated radiation emitted from the emitting unit of the TOF camera to said surveillance area and for deflecting the modulated radiation reflected by the surveillance area to the detector unit of the TOF camera;
  a control unit for calculating a three-dimensional image of the surveillance area from the modulated radiation received by said detector unit, wherein the control unit detects a distance between the emitting unit and the surveillance area as a function of a phase shift of the modulation present on the modulated radiation reflected from the surveillance area with respect to the modulated radiation emitted from the emitting unit and as a function of an additional optical path length defined by a geometric position of the at least one mirror with respect to the TOF camera unit and the background.

11. The optical surveillance system according to claim 10, wherein said control unit is further operable to evaluate said three-dimensional image and to output a safety switching signal in response to a result of the evaluation.

12. The optical surveillance system according to claim 10, wherein said emitting unit comprises at least one light emitting diode, LED, or infrared radiation emitting diode, IRED.

13. The optical surveillance system according to claim 10, wherein said detector unit comprises a phase sensitive detector chip and a signal processing unit for evaluating outputs of said detector chips.

14. The optical surveillance system according to claim 13, wherein said signal processing unit is operable to define and evaluate a first depth level representing the area directly illuminated by said emitting unit, and at least one second depth level representing the area illuminated by said emitting unit via said at least one mirror,
  wherein said signal processing unit is further operable to combine the images corresponding to the first and second depth levels for generating the three-dimensional image of the surveillance area.

15. The optical surveillance system according to claim 10, further comprising a carrier element, wherein said at least one mirror is held in a predetermined position with respect to said TOF camera by means of said carrier element.

16. The optical surveillance system according to claim 10, wherein a viewing angle of said detector unit is larger than needed for monitoring said surveillance area, and wherein said at least one mirror is located in a peripheral region of said viewing angle.

17. The optical surveillance system according to claim 10, wherein an aperture of said emitting unit is larger than needed for illuminating said surveillance area, and wherein said at least one mirror is arranged in a way that it deflects a peripheral portion of the modulated radiation.

18. The optical surveillance system according to claim 10, wherein said emitting unit and said detecting unit are arranged within a common camera housing and wherein a plurality of mirrors is arranged symmetrically around said camera housing.

19. The optical surveillance system according to claim 10, wherein said emitting unit comprises an array of light emitting diodes, LED, or infrared radiation emitting diodes, IRED which are arranged on a non-planar substrate and said detecting unit comprises an array of photonic mixer detectors, PMD), which are arranged on a non-planar substrate.

* * * * *